United States Patent [19]
Higgs

[11] Patent Number: 5,282,490
[45] Date of Patent: Feb. 1, 1994

[54] FLOW METERING INJECTION CONTROLLER

[76] Inventor: Robert E. Higgs, 10266 Basin St., Newburgh, Ind. 47630

[21] Appl. No.: 904,559

[22] Filed: Jun. 26, 1992

Related U.S. Application Data

[63] Continuation-in-part of Ser. No. 451,806, Dec. 18, 1989, abandoned.

[51] Int. Cl.$^5$ .............................................. F16K 31/12
[52] U.S. Cl. ...................................... 137/486; 137/500
[58] Field of Search ............... 137/501, 613, 486, 500; 251/333

[56] References Cited

U.S. PATENT DOCUMENTS

| | | | |
|---|---|---|---|
| 1,590,275 | 6/1926 | Bayless | 137/501 X |
| 1,688,812 | 10/1928 | Huff | 137/569 X |
| 2,141,715 | 12/1938 | Hilger | 137/500 X |
| 2,272,684 | 2/1942 | Vickers | 137/501 X |
| 3,028,876 | 4/1962 | Gratzmuller | 137/501 |
| 3,083,721 | 4/1963 | Matthews | 137/613 X |
| 3,194,254 | 7/1965 | Zmek | 137/501 X |
| 3,602,252 | 8/1971 | Barnes | 137/501 X |
| 3,885,590 | 5/1975 | Ford | 137/613 |
| 4,245,669 | 1/1981 | Schmidt | 137/501 X |
| 4,483,485 | 11/1984 | Kamiya et al. | 251/333 X |
| 4,629,561 | 12/1986 | Shirato et al. | 137/501 X |
| 4,813,443 | 3/1989 | Pounder | 137/486 X |

Primary Examiner—John C. Fox
Attorney, Agent, or Firm—Fisher, Christen & Sabol

[57] ABSTRACT

A differential pressure regulator and accompanying system enabling accurate metering of fluid under high-pressure, low-flow conditions. An annular passage within the fluid flow path of the regulator creates an additional pressure drop within the regulator to reduce fluid velocity within the regulator and associated wear problems. A ball and seat mechanism is specially sized with respect to a piston and provides improved accuracy.

3 Claims, 3 Drawing Sheets

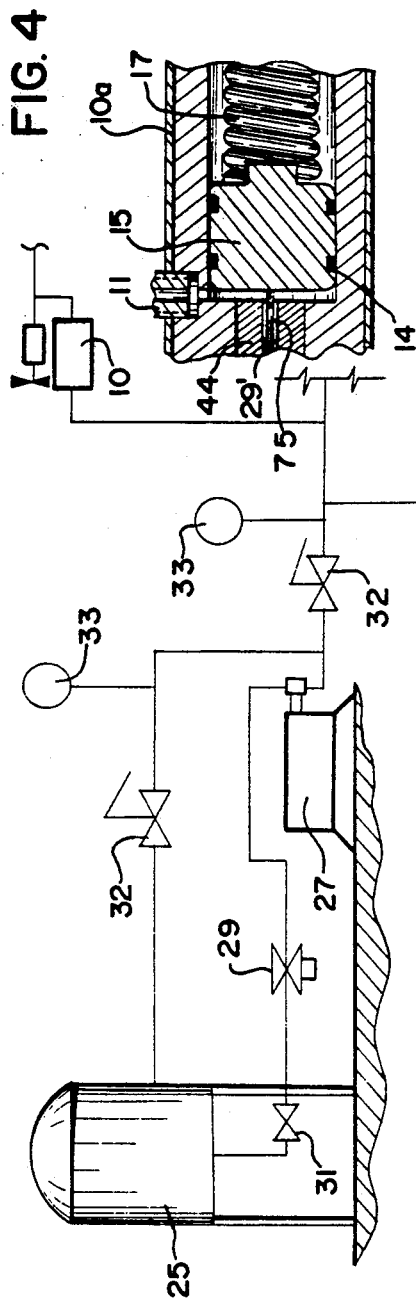
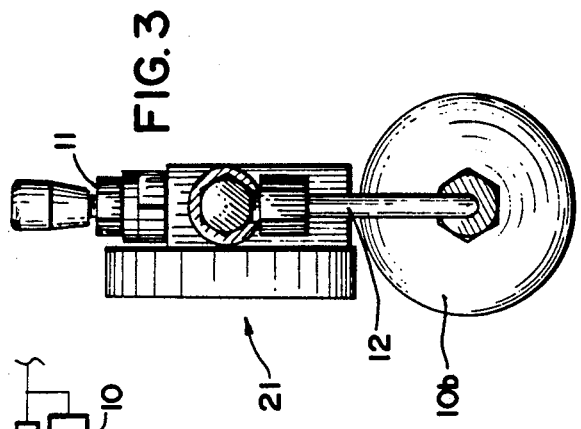
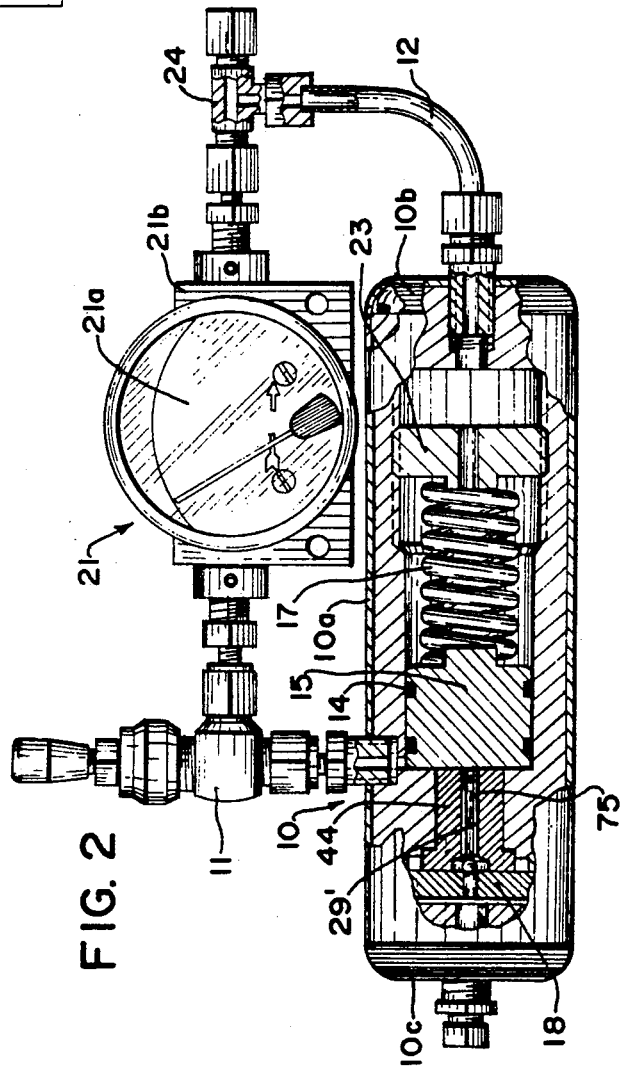

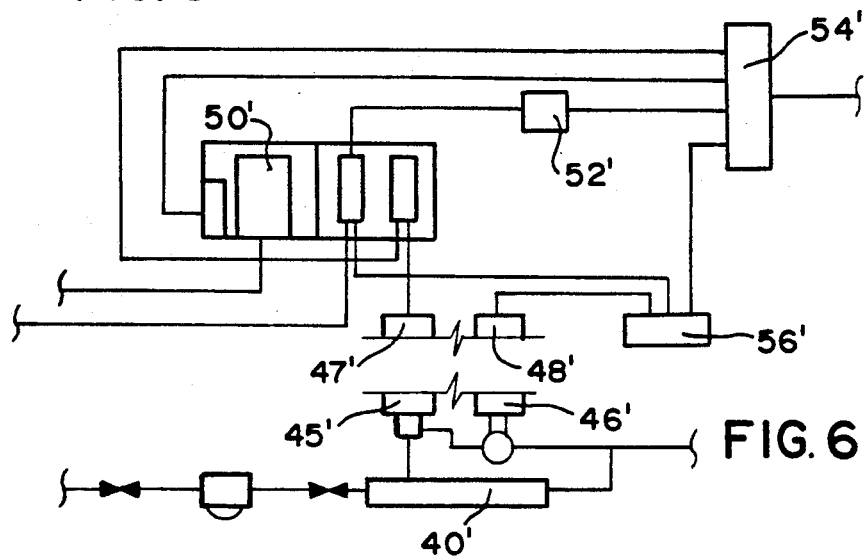
FIG. 5
FIG. 6
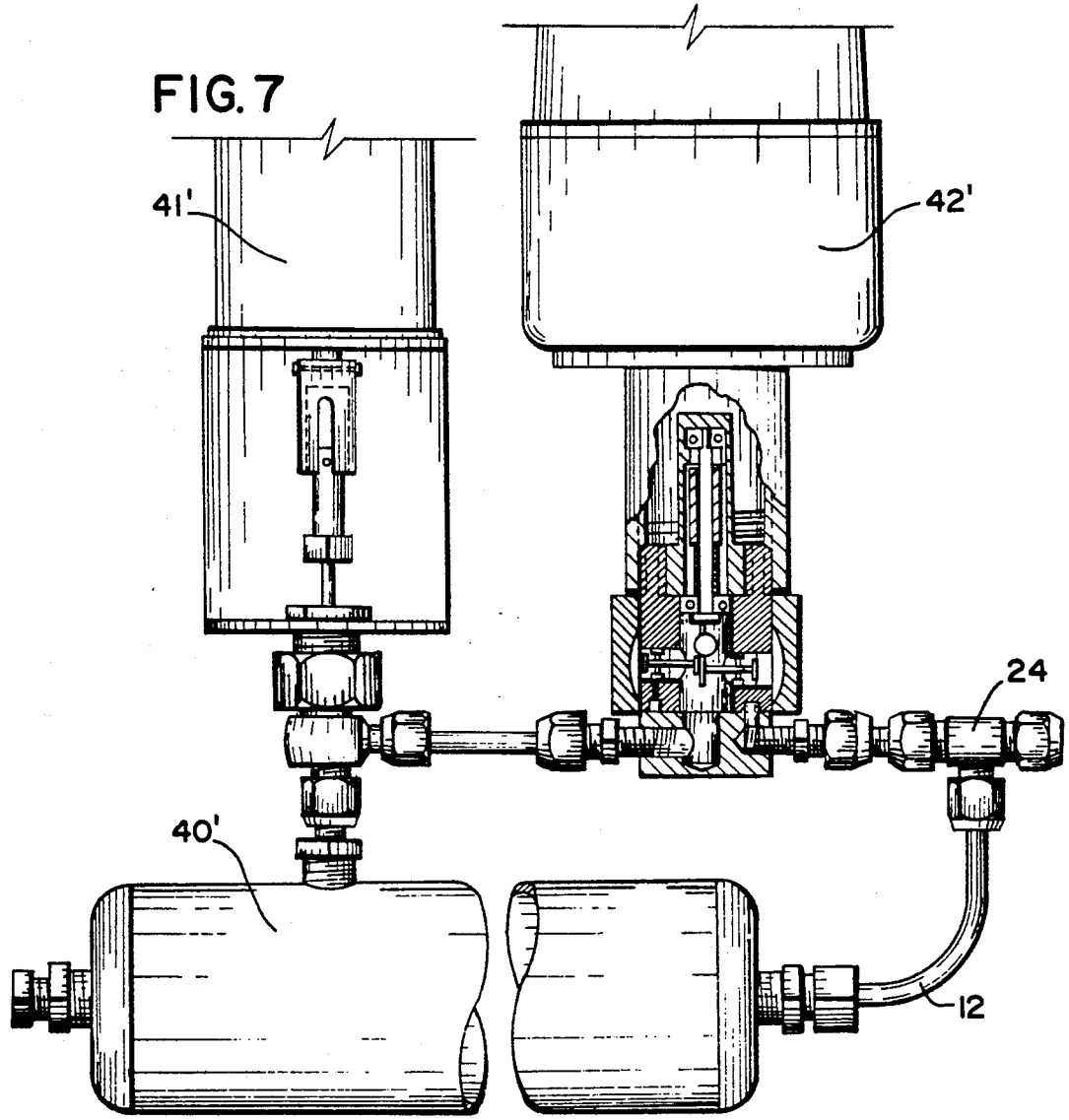
FIG. 7

FLOW METERING INJECTION CONTROLLER

The present application is a continuation-in-part of patent application Ser. No. 451,806, filed Dec. 18, 1989, with the same title and invention, now abandoned.

As is known, a need exists at various industrial production facilities involving high pressure low flow conditions for mechanically metering, monitoring and injecting specific amounts of materials required for a variety of end purposes, to-wit, additives, dyes, reagent type chemicals, resins, corrosion inhibitors, other forms of chemicals, stabilizers, and emulsion breakers to mention but a few.

In other words, a far reaching need extends, broadly, for high pressure low flow mechanical chemical feed/control systems. More specifically, and by way of further example, a need also exists for the removal of the pulsations inherent with the use of positive displacement pumps through an arrangement omitting such.

In any event, the industrial magnitude of invention usages is almost unending, where countless modifications to satisfy and/or custom refine an ongoing problem is accomplishable. Such applications may include, still by way of example, multi-location chemical injection via a single pump header arrangement; systems requiring high pressure and extremely low yet verifiable flow or injection rates; applications requiring future expansion at lower installation cost; and, applications where electrical and pneumatic supply sources are limited or undesirable.

BACKGROUND OF THE INVENTION

Briefly, and basically, the self-contained controller of the invention maintains constant low flow rates of fluids regardless of downstream pressure or pressure changes, incorporating a metering valve as an integral part of the controller and, preferably, includes a direct read dial flow indicator. The controller discharges liquids at a fixed high pressure greater than the downstream pressure and allows continuous non-pulsive flow even from piston or diaphragm type pumps.

Existing differential pressure regulation devices, such as the Moore Model Series 63DL, manufactured by Moore Products Co. of Spring House, Pa., and similar devices by other manufacturers, are designed for relatively low pressure and high flow rate applications (generally in the range of 30-210 gallons per hour). When these units are used for extremely low flow rates (0.005-10.0 gallons per hour), problems are encountered. Extremely high velocities are produced within the pressure regulation device, causing associated erosion of seat material and extreme chemical or fluid shear. Such problems have been found to lead to inaccurate metering, an inability to operate at extremely low flow rates, and shortened useful life of the unit due to deterioration of the valve seat.

DISCLOSURE OF THE INVENTION

Features of the present invention are to provide a differential pressure regulating device that 20 operates under extreme low flow high pressure conditions; to provide such a device which will function accurately over extended periods of time; and, to provide a chemical injection system for process lines that is capable of accurately metering injection chemicals into the pipeline under high pressure low flow conditions.

The aforesaid results are achieved by providing a differential pressure/flow regulator having a specially designed flow channel. An annular passage within the differential pressure regulator is sized to create a pressure drop within the regulator at high pressure low flow conditions, thereby substantially reducing the pressure drop and resultant high fluid velocities that otherwise would occur at the seat of the unit. High velocity wear points in the flow path are thus eliminated.

The invention also preferably includes a seat-ball that is relatively small with respect to the main piston of the unit, providing increased accuracy, as described in more detail herebelow.

The metering controller of the invention is capable of injecting a continuous flow of chemical, for example, in contrast to intermittent flow, through the use of positive displacement metering pumps. The preceding is a significant advantage in many applications where low chemical contact time is a concern or where a uniform blend of two or more chemical components is desired.

BRIEF DESCRIPTION OF THE FIGURES

In any event, a better understanding of the invention will become more apparent from the following description, taken in conjunction with the accompanying drawings, wherein FIG. 1 is a schematic representation of a typical installation employing a flow metering injection controller in accordance with the teachings of the present invention;

FIG. 2 is a view in front elevation of the controller presented herein, partly broken away and in vertical section to detail certain of the components prior to piston movement;

FIG. 2b is a view in side elevation of one of the components making up the controller of FIGS. 2-2a;

FIG. 2c is a view in side elevation detailing another component of FIGS. 2-2a;

FIG. 3 is a view in end elevation, looking from right to left in FIG. 2, affording further details of the invention;

FIG. 4 is another view in vertical section showing the piston after movement;

FIG. 5 is schematic representation of a typical controller installation detailing the electrical circuitry;

FIG. 6 is a schematic representation of an installation showing the mechanical circuitry operable with FIG. 5; and, FIG. 7 is a view in front elevation, partly broken away, detailing a modified controller in accordance with the teachings of the invention.

Figure 2A:
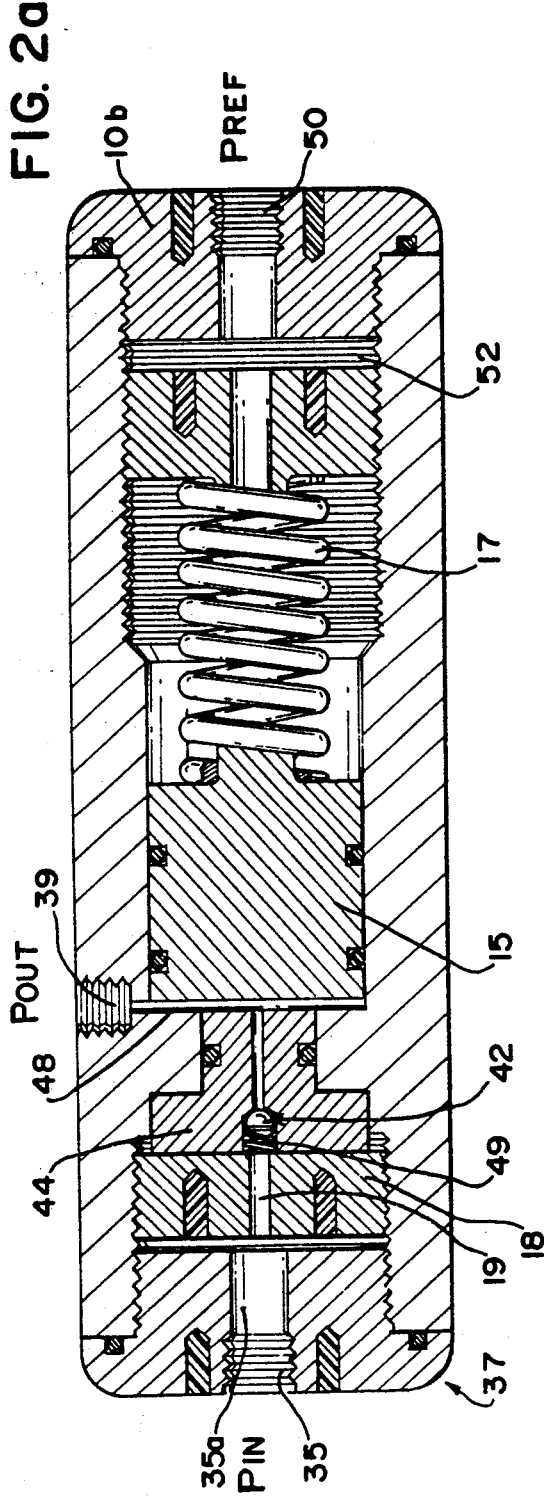
FIG. 2a is a view comparable to FIG. 2, but further detailing the invention upon piston movement.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

DESCRIPTION OF THE PREFERRED EMBODIMENTS

The figures presented herein illustrate an application of the controller of the invention in two typical installations, i.e. one representative of controller usage in a multi-location metering mechanical system, and the other, a modified controller, in a closed loop system serving, for example, ratio, as pH, purposes.

More specifically, the controller 10,40' of the invention, either as respectively presented in FIGS. 2, 2a, 3 and 4 or in modified form in FIG. 7, is an integral part of the system of FIG. 1, and, as well, the system of FIGS. 5 and 6.

Figure 2B:
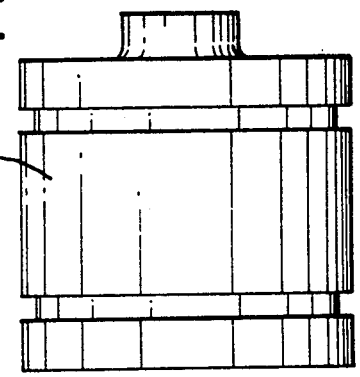

FIGS. 2–2a illustrates a differential pressure regulator 10 of the invention in the form of a cylindrical body including a central bore of varying diameters which extends longitudinally through the body to house the various components of the regulator.

The fluid to be regulated, such as scale-inhibiting chemicals in liquid form, enters the regulator under pressure $P_{In}$ through a fluid inlet 35 at the inlet end 37 of the regulator and exits the regulator at a pressure $P_{Out}$ at a fluid outlet 39 that extends transversely from the bore in the central portion of the regulator body.

Fluid at the reference pressure $P_{Ref}$ is directed into the regulator at the reference end 10b of the regulator. As the fluid travels between the fluid inlet and the fluid outlet, it is regulated such that the outlet pressure $P_{Out}$ is a constant differential greater than the reference pressure $P_{Ref}$.

The value of $P_{Out}$ is controlled by applying preset, opposed, longitudinal forces to control members within the regulator, as described below. Devices of this type are sometimes referred to as dome-loaded pressure regulators.

An identification and explanation of the mechanical components and fluid forces within the regulator is necessary to a proper understanding of operation. Fluid to be regulated enters the regulator through the fluid inlet at the inlet end 37 of the bore.

The fluid then enters an inlet passage 35a and travels through a passageway 19 formed in a seat member 18. A poppet 42 is housed at an end of a passageway 29' in another seat member 44 and biased towards seating by a seat spring 49 housed within the seat member 44. Fluid travels past the ball and seat into the annular passageway 29' formed by a cylindrical bore in the seat member 44 and the cylindrical portion 75 of the poppet 42 therein.

Fluid enters an outlet passage 48 from the annular passageway 29' and exits the regulator through the fluid outlet at the regulated pressure $P_{Out}$.

At the reference end of the regulator, hydraulic input is received into a reference passage 50 at the reference pressure $P_{Ref}$. Reference fluid from the reference passage communicates with an adjoining chamber 52 and flows toward a piston 15 that is slidably mounted within the bore. The piston 15 is biased towards the inlet end of the bore by the reference fluid and a main spring 17 which engages the reference end of the piston 15.

An adjustment member engages the reference end of the main spring 17 to compress the spring into a preload condition during normal operation. The inlet end of the piston 15 engages the end of the poppet which is slidably housed within the seat member 44 to form the annular passage.

In the preferred embodiment illustrated in FIGS. 2–2a, each end of the bore is threaded. The reference end of the bore is sealed by a threaded end cap 10b. At the inlet end of the bore, a locking member is mounted in the threaded portion to engage the seat member 44 and seat spring 49 and preload the seat spring 49 during normal operation. An inlet end cap 10c is mounted at the inlet end of the bore to seal the bore.

The end caps and locking members each include assembly bores for receiving a compatibly shaped tool (not shown), as a spanner wrench, for threading the pieces into place during manufacture. The assembly bores that are accessible from the exterior of the regulator are preferably filled with correspondingly sized pins after assembly of the unit to prevent tampering with the unit in the field.

The operation of the differential pressure regulator of the type disclosed herein can be understood by examining the fluid and mechanical forces that act on the piston 15 housed within the regulator. Forces acting to push the piston 15 toward the inlet end of the regulator (to the left in FIGS. 2 and 2a) will be considered positive. The piston receives forces from the main spring ($F_{S1}$), the reference fluid ($F_{P(Ref)}$), the outlet fluid ($F_{P(Out)}$), and the poppet ($F_D$). Balancing the forces acting on the piston yields the following equation:

$F_{P(Ref)} + F_{S1} - F_D - F_{P(Out)} = 0$    (Equation 1)

where $F_{P(Ref)}$ = force of reference fluid on piston    (Equation 2)
    = $(P_{Ref})A_p$ where $A_p$ = cross-sectional area of piston $F_{S1}$ = force of main spring on piston    (Equation 3)
    = $K1(X1 + DX1)$ where $K1$ = spring constant main spring
$X1$ = main spring travel during operation
$DX1$ = main spring preload $F_{P(Out)}$ = force of outlet fluid on piston    (Equation 4)
    = $P_{Out}A_P$ where $A_p$ = cross-sectional area of piston $F_D$ = force of poppet on piston    (Equation 5)
    = net force on ball which drives poppet
    = $P_{Out}A_B = P_{In}A_B + F_{S2}$ where $A_B$ = cross-sectional area of ball $F_{S2}$ = force of ball spring on ball    (Equation 6)
    = $K2(X2 + DX2)$ where $K2$ = spring constant of ball spring
$X2$ = ball spring travel
$DX2$ = ball spring preload In accordance with the teachings herein, an accurate differential pressure ($P_{Out}-P_{Ref}$) is obtained by utilizing a ball having a diameter which is relatively small as compared to the diameter of the piston.

Substituting values for Equation 1 above will yield the following equation:

$$P_{Out} - P_{Ref} = \frac{F_{S1}}{A_p} - \frac{F_{S2}}{A_p} - \frac{A_B}{A_p}(P_{In} - P_{Out}) \quad \text{(Equation 7)}$$

It can be seen from Equation 7 that the differential pressure maintained by the regulator will be a function of values that can be preset in the regulator (i.e., $F_{S1}$, $F_{S2}$, $A_p$) except the term:

$$\frac{A_B}{A_p}(P_{In} - P_{Out})$$

It has been discovered that in high pressure low flow conditions, extreme accuracy can be obtained by minimizing the cross-sectional area of the ball $A_B$ and maximizing the cross-sectional area of the piston $A_p$ to force this term to zero. Thus, in accordance with the invention, the ratio $A_B/A_p$ is maintained at a value equal to 0.012 or less, and preferably 0.009 or less, to maintain an accurate differential pressure under high pressure low flow conditions.

The preferred embodiment of the invention also includes a specially designed annular passage. In a pressure regulating unit of the instant type, total pressure drop (DP total) through the pressure regulating unit can be described as follows:

$$DP\text{ total} = P_{In} - P_{Out}$$
$$= DP\text{ inlet} + DP\text{ seat} + DP\text{ outlet}$$

where
DP inlet = pressure drop through inlet orifice or channel
DP seat = pressure drop across pressure/flow regulating seat
DP outlet = pressure drop across outlet orifice or channel At very low flow rates, DP inlet and DP outlet each approach zero, such that the total pressure drop within the unit must be taken at the seat. Thus, DP total = DP seat.

The pressure drop across the seat can be estimated using the equation for a square-edged orifice which describes a "best case" flow scenario at the seat. The flow equation is as follows:

$$Q = 96.3\ CA\ \sqrt{DP/r} \qquad \text{(Equation 8)}$$

where
C = flow coefficient (0.55 for low-flow small orifices)
A = cross-sectional area through which flow occurs (ft$^2$)
DP = pressure drop across the seat (psig)
r = density of fluid (lbs/ft$^3$)
Q = flow rate (ft$^3$/sec)

The velocity through the seat can be described using the relation:

$$V = Q/A \qquad \text{(Equation 9)}$$

where V = velocity in ft/sec
Q = flow rate in ft$^3$/sec
A = area in ft$^2$

Substituting Equation 9 into Equation 8 yields:

$$VA = 96.3\ CA\ \sqrt{DP/r}$$

$$V = 96.3\ C\ \sqrt{DP/r} \qquad \text{(Equation 10)}$$

$$V = K\ \sqrt{DP/r}$$

where K = constant of proportionality.

At relatively high flow rates, pressure drop is distributed throughout the regulator unit and velocity is not a major problem. However, at very low flow rates, DP total = DP seat and the entire internal pressure drop is taken at the seat. Equation 10 indicates a very high velocity occurring at the seat, with resultant eroding of the seat material.

The preceding problem is addressed by adding an annular passage having a very small annular cross-section to the fluid flow path within the regulator, such that a pressure drop will occur in the fluid as it passes through the annular passage. With a pressure drop occurring in the annular passage, the pressure drop at the seat is greatly reduced, causing a corresponding reduction in velocity and associated wear problems.

Moreover, the spacing between the poppet and seat member in the annular passage is sized so that flow in the annular passage can be compared as flow between infinite parallel plates. Such a comparison assumes the following: (1) steady flow; (2) fully developed flow; and, (3) neglecting gravity and other bodily forces.

The following relationship can be shown to be applicable:

$$DP\text{ annulus} = \frac{(Q)UL}{\pi DA^3} \qquad \text{(Equation 11)} \quad (12)$$

where
Q = flow rate in ft$^3$/sec
U = viscosity in lb sec/ft$^2$
L = length of the annular passage in feet
$\pi$ = 3.14159
D = drive pin diameter in ft
A = radial clearance in ft Using the above equation, an annular passage is preferably specially designed for a given application by inserting the appropriate values into the equation for the viscosity of the fluid to be regulated, the desired flow rate, and the pressure drop to be taken by the annular passage.

The annular passage will preferably take a large portion of the total pressure drop, leaving a portion of the pressure drop to be taken at the seat to enable throttling to occur at the seat. If all the pressure drop is taken in the annular passage, the ball/seat system at the seat would be unable to open and close. Thus, in preferred embodiments designed for the system of FIG. 1, 80 percent of the internal pressure drop was designed to be taken at the annulus.

Figure 2C:
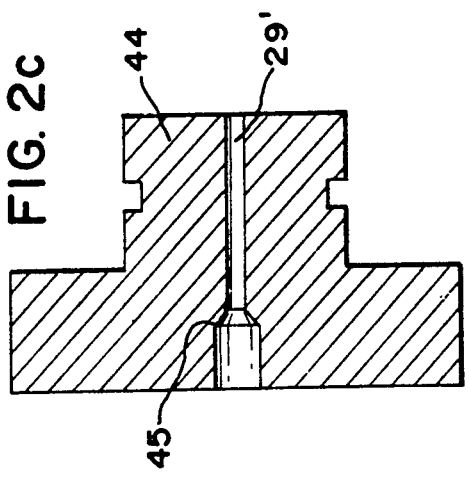

A detailed view of the seat member 44 is shown in FIGS. 2a and 2c. In the preferred embodiment, the seat member 44 is fabricated from stainless steel and includes a 0.141 inch chamfer surface forming the seat 45. The seat adjoins a 0.063 inch diameter, 0.625 inch long cylindrical bore 29' that receives a 0.059 inch diameter poppet 42 in the annular passage. The poppet in the preferred embodiment illustrated herein is 0.50 inch long and fabricated from stainless steel and includes a 0.125 inch diameter ball on the end.

Flow is typically adjusted through a twenty-turn metering valve 11 and the resulting flow is read on the direct read dial flow indicating device 21 (downstream of the metering valve 11).

As evident from FIG. 1, controllers 10 are typically installed in a multi-location delivery system which includes liquid/fluid storage tank 25, pump 27, inlet filter 29, ball valve 31, back pressure and pressure reducing regulators 32, and pressure gauges 33, all leading to an appropriate header line. For multi-injection, high pressure low flow conditions, it is preferred to use a forward pressure regulator capable of accurately regulating fluid pressure under such conditions.

Referring now to the controller 40' disclosed in FIG. 7, such is, as stated, an integral part of the system of FIGS. 5 and 6. In this connection, the controller 40' deals with a closed loop defined as an automated electronic/mechanical control system which works with accurate digital based information supplied from both ends and controlled from the center, where one end may represent a process flow stream or condition in the form of an electronic signal proportional to same and the other end an electrical signal proportional to flow provided by controller 40'. The center, in a typical preferred embodiment, is a processor, such as a programmed logic controller (PLC) and/or a personal computer (PC) based system, into which input signals are introduced.

Representative types of closed loop applications include high pressure low flow control responsive to a condition, such as pH, conductivity, speed, or time, or in the control of a stream blending a substance into an actual or known volumetric flow, as in plastics (e.g., the blending of liquid additives in proportional amounts to the delivery of bulk feed resins) or in the gasoline industry (e.g. the blending of gasoline additives in proportional amounts into untreated gasoline streams).

In a usage directed to pH control, for example, a pH sensor and a transmitter on a liquid containing line or vessel serves to measure and forward pH data into a microprocessor based programmed logic controller (PLC) at the center of the loop. The processor looks at the actual pH signal in comparison to the desired pH condition "set point" and sends an electrical signal to controller 40' to affect a desired change, if required.

Any reference to pH application above serves merely as a representative use situation selectively involving a controller 10 of the general type illustrated in FIGS. 2, 3 and 4, but modified to the showing of FIG. 7 (controller 40'), as through a metering valve actuator 41' (used instead of metering valve 11) and an electro-mechanical flow meter 42' (used instead of the flow indicating device 21).

In a closed loop situation, a conversion is achieved, i.e. a positive displacement (PD) flow transducer (mechanical) responsive to electronic read-outs in the form of transmitters (electronic). An electronic signal is achieved which is proportional to fluid flow or a condition.

Referring to FIGS. 5 and 6, the controller 40', serving a closed loop system function, includes metering valve actuator 41', as an electromechanical control valve. The latter may be, for example, 115V AC and reversibly motorized; in the form of a packless/pack arrangement; and, include electrical feedback in the form of limit switches and/or a potentiometer. In any event, such serves the ability to remotely monitor and adjust the valve coefficient and to permit desired flow. The preceding structure, not detailed in the figure, is used with a pressure control device, as controller 40'.

Flow meter 42', in this embodiment, is presented as a positive displacement unit coupled to an electronic transmitter which, for example, utilizes a photo-optic sensor pickup to transmit an electrical signal which is proportional to the volumetric flow (or flow condition) to the flow meter 42'.

Flow meter 42' serves to provide an accurate verifiable flow signal which may be transmitted remotely to a processor, whereby the flow data thereof is representative of flow achieved by the adjustment of metering valve actuator 41'. Restated otherwise, flow meter 42' performs an actual verification of flow i achieved by metering valve actuator 41'. Thus, with constant P, as provided by controller 40', and a constant repeatable $C_v$ as provided by metering valve actuator 41', flow meter 42' will also be constant and serves only as a verification of flow achieved by controller 40 and metering valve actuator 41'.

In kindred uses, metering valve actuator 41' can be removed and replaced by metering valve 11, whereby a remote signal representative of flow is all that is required, or, in the alternative, flow meter 42' may be removed and replaced by flow indicating device 21 while still utilizing metering valve actuator 41' in conjunction therewith to provide local indication of flow with remote control.

As to FIGS. 5 and 6, and in a preferred embodiment, FIG. 6 shows a mechanical arrangement including controller 40', serving, however, in a manner, to provide individual pressure and flow control in a centralized multi-point or multi-location system which, in such instance, may include a (non-rotating) stem control valve 45' and a positive displacement flow meter 46'.

FIG. 5, in such preferred embodiment, shows an electrical/electronic arrangement which may include an electric motorized actuator (with or without feedback) in the form of limit switches or a potention-meter, represented by reference numeral 47'; an electronic optical sensor, with pickup transmitter in the form of frequency or analog output from a signal 24 DC control power output; a microprocessor based processor with an I/O configuration providing inputs and outputs in the form of, for example, 115V AC, 24V DC, and 4–20 milliamp (Ma) analog and frequency signals; a common 24V DC power module; a terminal block arrangement of 115/230 voltage control; and, a microprocessor based rate and/or totalizer, with frequency and analog I/O and with menu-driven user configurable program, represented by reference numeral 56'.

FIG. 5 is the electrical/electronic control for a multihead system (using controller 40' of FIG. 6) which provides automation (closed loop control), i.e. automated control and monitoring. Microprossessor based processor 50' utilizes a developed software program to provide instantaneous monitor/adjustment control, as required. Thus, FIGS. 5 and 6 provide an easily expandable or reconfigurable automatic system as experience defines requirements.

FIGS. 1, 5 and 6 are similar to the extent of presenting high pressure low flow control, where verification to considerable accuracies, without control (mechanical), flow and pressure compensation (either the automatic or another version of FIG. 5), would not otherwise be possible. Flow meter 46', control valve 45' and controller 40', in FIG. 6, provide constant stabilization and equalization of process pressure and control of flow of same, where any variation or unbalance of pressure would result in all items (in FIGS. 1, 5 and 6) to be continuously in unwanted "hunting."

Thus, two systems, common in part, are presented and/or illustrated herein, the first identifiable as a mechanical multi-point or multi-flow high pressure low fluid flow disposal system served by a single centralized pump, whereby individual rates and specific amounts of liquid can be adequately and uniformly discharged, i.e. controlled, and measured, to individual local or remote locations irrespective of downstream process pressure conditions because of constant differential pressure achieved by the controller for each location.

The second system is identifiable as an automated version of the above, including a microprocessor based processor with certain electronic and electrical controls which provide on-line real time closed loop process monitoring and control.

The common denominator between the two systems is the multi-point disposition of liquids served by a centralized controller (10,40') utilizing the differential pressure theory to accurately and repeatedly control a given flow stream. The latter may be in the form of flow rate, total, speed or time conditions, or other quality functions. An electronic sensor provides an electrical signal representative of the aforementioned flow rate, total, speed or time conditions, or other quality functions, from the controlled process and into the micro processor based processor at the center.

In further contrasting controller 10 (FIG. 2) from controller 40' (FIG. 7), the latter serves to provide a specific gravity and viscosity compensated automated controller system, whereas controller 10 is chemically dependent. In other words, the latter is selective to a fixed chemical (because of a fixed area orifice coupled with a fixed differential pressure, i.e. such cannot vary without recalibration).

The loop arrangement of the invention is readily workable with three forms of industrial applications with which the invention may be employed, to-wit, a batching system, a blending system and a treatment system.

The batching system is involved with volume, speed and time and does not require the usage of a process signal, i.e. one which determines a condition of the controlled system.

On the other hand, the blending system and the treatment system each require the process signal, determining the condition, to be fed into a micro processor based processor (which has an established desired "set point"). The flow signal, actually representing what is flowing and confirming the results, is also introduced into the processor. The processor, in turn, feeds an actuator valve which modulates upwardly and downwardly, changing the $C_v$, which increases or decreases the liquid flow. The $C_v$ is maintained until a disruption occurs in the control process requiring further adjustments.

In any event, the controller(s) presented herein is susceptible to various changes within the spirit of the invention, including the many applications and/or usages thereof (where the latter have only been representatively discussed). Controller changes may include proportioning, component placement, material selection, and, the like. Thus, the preceding description should be considered illustrative and not as limiting the scope of the following claims:

I claim:

1. A dome-loaded apparatus for regulating fluid to a preset high differential pressure with respect to a reference pressure comprising a flow path through the apparatus through which said fluid travels, said flow path including an inlet and an outlet communicating with the exterior of the apparatus, said fluid travelling downstream through said flow path from said inlet to said outlet of said apparatus, non-sharp edged seat means positioned within said flow path intermediate said inlet and said outlet, a ball positioned in said flow path upstream of an adjacent to said seat means, said ball having a surface adapted to mate with said seat means, means for biasing said ball toward said seat means to restrict downstream fluid flow through said seat means, a piston slidably mounted within said apparatus, said piston having a seat end and a reference end, the ratio of the cross-sectional area of said ball to the cross-sectional area of the seat end of said piston being 0.012 or less, a reference fluid chamber defined in part by said reference end of said piston permitting said fluid within said reference fluid chamber to engage said reference end of said piston, means biasing said piston away from said reference fluid chamber, an elongated drive member, one end of said elongated drive member engaging said seat end of said piston and another end engaging said ball, said drive member transmitting forces from said reference fluid chamber and said piston in a biasing relationship with said ball and urging said ball away from said seat means, and an annular passage in said flow path extending downstream from said seat means along said drive member and restricting said fluid flow through said flow path and causing a pressure drop across said annular passage resulting in a decrease of the velocity of said fluid traveling through said seat means and annular passage.

2. Dome-loaded apparatus for regulating liquid to a preset high differential pressure as claimed in claim 1 wherein said annular passage is sized to simulate flow between infinite parallel plates.

3. Dome-loaded apparatus for regulating liquid to a preset high differential pressure as claimed in claim 1 wherein the ratio of the cross-sectional area of said ball to the cross-sectional area of the seat end of said piston is 0.009 or less.

* * * * *